United States Patent [19]

Haque et al.

[11] 4,449,864

[45] May 22, 1984

[54] CONSUMABLE SELF-REGENERATIVE LEDGE CUTTING INSERT

[76] Inventors: Sazzadul Haque, 3290 Wolverine, Troy, Mich. 48084; Terry A. Schroeder, 35905 Fredericksburg, Farmington Hills, Mich. 48018

[21] Appl. No.: 328,194

[22] Filed: Dec. 7, 1981

[51] Int. Cl.³ .............................................. B26D 1/00
[52] U.S. Cl. ..................................... 407/113; 407/42; 407/120; 82/1 C; 409/66
[58] Field of Search ............... 82/1 C, 36 R; 407/2-6, 407/100, 113-115, 42, 118-120, 34; 408/144, 408/145; 409/66; 76/101 R, 101 A; 75/240, 241, 75/242; 428/571,600

[56] References Cited

U.S. PATENT DOCUMENTS

| | | | |
|---|---|---|---|
| 1,769,222 | 7/1930 | Ignatieff | 407/119 |
| 2,233,724 | 3/1941 | Bannister et al. | 29/103 |
| 3,188,717 | 6/1965 | Heinlein | 407/114 |
| 3,341,920 | 9/1967 | Kelm | 407/113 |
| 3,343,431 | 9/1967 | Boyer | 407/113 |
| 3,369,283 | 2/1968 | Colding | 407/113 |
| 3,416,209 | 12/1968 | Contrucci et al. | 407/113 |
| 3,564,683 | 2/1971 | Schedler et al. | 407/119 |
| 3,618,654 | 11/1971 | Meserve | 407/120 |
| 3,716,900 | 2/1973 | Erkfritz | 407/114 |
| 3,745,623 | 7/1973 | Wentorf, Jr. et al. | 76/101 A |
| 4,294,566 | 10/1981 | Boone | 407/114 |

FOREIGN PATENT DOCUMENTS

| | | | |
|---|---|---|---|
| 877531 | 5/1953 | Fed. Rep. of Germany | 407/118 |
| 197707 | 7/1977 | U.S.S.R. | 407/120 |

OTHER PUBLICATIONS

"Modified Geometry Prolong Tool Life", Manufacturing Engineering, Mar. 1980, p. 53.

*Primary Examiner*—Leonidas Vlachos
*Attorney, Agent, or Firm*—James J. Lichiello; Ernest F. Chapman

[57] ABSTRACT

A cutting insert includes a planar body member formed unitary with peripheral ledges of smaller width than the body member, with the ledges being configured and aligned relative to the body member to achieve desired rake angles, both axial and radial as well as the clearance angle desired of the cutting geometry. In operation, each elongated ledge defines the cutting edge of the cutting insert and during operation of the cutting insert, the ledge is consumed and thus generates a fresh edge behind it along the entire length of the ledge such that the cutting process may be maintained continuous until the entire length of the ledge is consumed. The cutting insert may then be indexed to the next ledge cutting edge.

16 Claims, 12 Drawing Figures

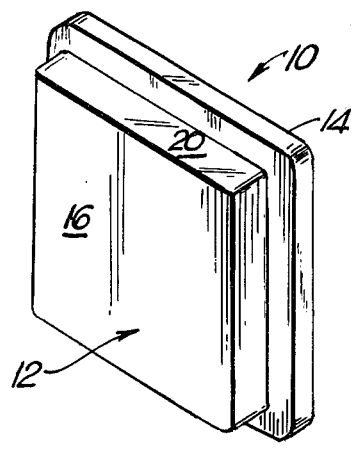
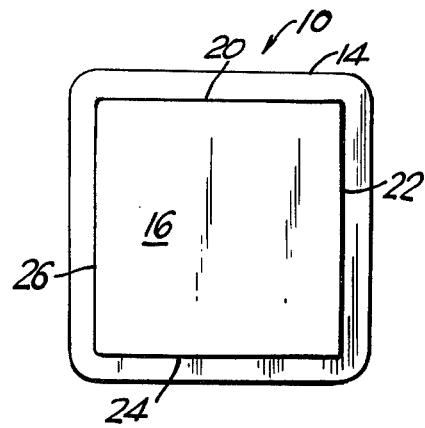
FIG. 1          FIG. 2
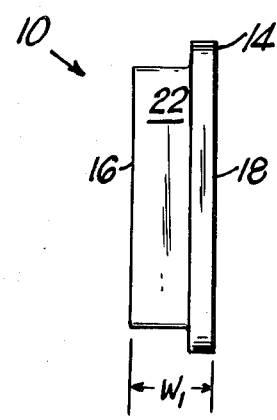
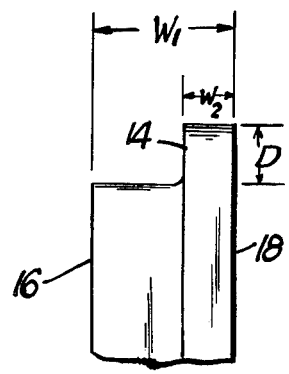
FIG. 3          FIG. 4

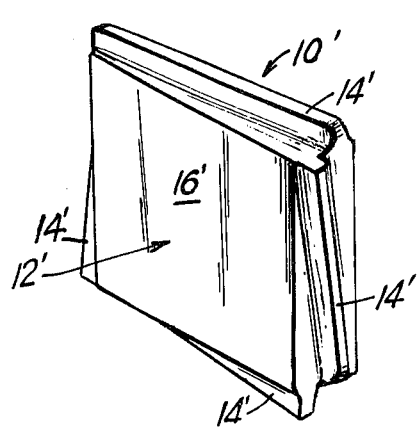
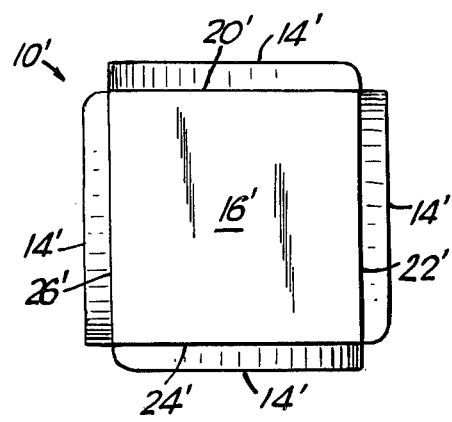
FIG. 8　　　　　　FIG. 9
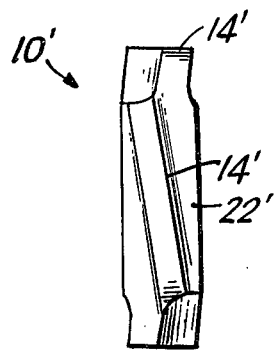
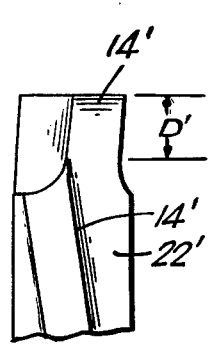
FIG.10　　　　　　FIG. 11
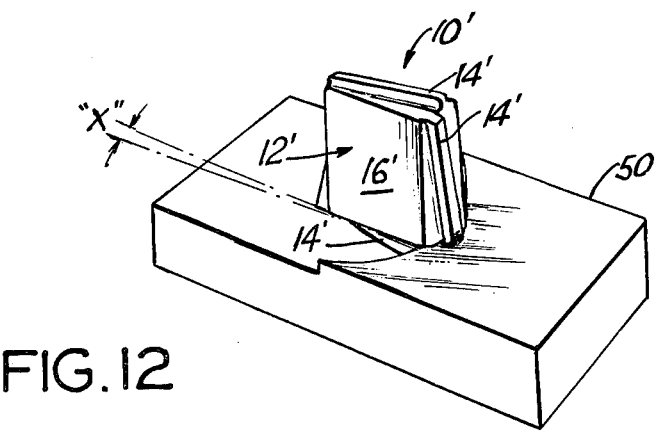
FIG.12

CONSUMABLE SELF-REGENERATIVE LEDGE CUTTING INSERT

BACKGROUND OF THE INVENTION

A milling cutter is a rotating disc with one or more cutting elements attached to its periphery that progressively removes stock as it traverses the workpiece beneath it. In a modular design of a milling cutter tool, the entities which make up a complete milling cutter assembly are treated as a unity, and include the body module to which all of the other modules are eventually attached or machined. In the body module is machined the mounting screw hole pattern, the drive module, the insert pocket module containing the insert, wedge, rest button, and screws, and the chip pocket module. Generally speaking, there are many different configurations of the body module in order to accommodate specific types of cutting inserts in order to achieve a certain cutting objective. In other words, the lead angle, the radial rake angle, and the axial rake angle of the cutter body design will vary as a function of the other module components which are utilized to form the milling cutter assembly.

The requirement for various different combinations of body modules, as well as the other modules of the assembly, in order to achieve a desired cutting instrument requires a large inventory of modular parts. It is an object of the subject invention to overcome this requirement for a large number of parts, and to provide a new and improved milling system having a single cutter body design. Preferably the latter has a zero to one degree lead angle, a zero degree radial rake, and a small axial rake angle, e.g., from minus one degree to plus five degrees. The single cutter body design may be employed with a plurality of different cutting inserts made according to the subject invention, to accommodate the axial, radial, and lead angles of a milling geometry, rather than the cutter insert being designed to accommodate the milling cutter body module.

Prior art milling cutters employed in the milling of difficult-to-machine materials, such as titanium 6AL-4V, at high metal removal rates normally machine at a rate of about 60 to 100 surface feet per minute (SFPM) and at a feed rate of 0.004 to 0.010 inches per tooth, even with the present state of the art tungsten carbide tools. Under normal machining practice, as the cutting edge wears and dulls the tool, the cutting insert is taken off after a certain predetermined period of time (based on the surface finish, the part size, the flank wear, the nose wear, and deformation of the cutting insert) or else, if further cutting is attempted, the cutting edge either breaks or burns out due to the force and temperature build-up. Furthermore, to allow the cutting edge to go to a later stage could result in a damaged workpiece part, damaged cutter, and thus is generally avoided. To prolong the life of the tool, present milling cutters are designed such that the cutting edges of the insert are indexed, and a fresh cutting edge is presented to the workpiece, and it has also been suggested to design the insert to reduce the length of the tool-chip contact, as well as controlling the length of the tool flank, as discussed in the publication Manufacturing Engineering, March 1980 at page 53.

In order to overcome the above mentioned shortcomings of prior art milling tools, it is an object of the subject invention to provide a cutting insert capable of machining difficult-to-machine materials, such as titanium 6AL-4V, at higher cutting speeds, e.g., four to six times the normal cutting speed (approximately 600 SFPM) with higher tool life. The subject invention could be applied to other materials, such as cast irons and steels and would provide the advantages of higher speed with reduced forces, thereby reducing the horsepower consumption for the same rate of material removal. Furthermore, machining time would be reduced, thereby resulting in high production rates, and with improved surface finishes.

SUMMARY OF THE INVENTION

The above and other objects and advantages of the invention are achieved by an improved cutting insert having a cutting edge which is so oriented that it is consumed during a cutting operation, and while being consumed, generates a fresh cutting edge such that the cutting process is continuous until the entire length of the cutting edge is consumed.

The subject invention is more particularly directed to a cutting insert having cutting edges defined by consumable self-regenerative ledges, with the orientation of each consumable self-regenerative ledge being designed to accommodate the desired axial, radial and lead angles of the milling geometry, instead of the milling cutter body. Hence, the consumable self-regenerative ledge cutting insert of the subject invention may be secured as a module to a standard cutter body module having a zero to one degree lead angle, zero degree radial rake, and an axial rake which is preferably on the order of minus one degree to plus five degrees. The new and improved consumable self-regenerative ledge cutting insert may be readily secured to the cutter body by either a built-in pocket type holding mechanism or a cartridge type holding mechanism.

The new and improved consumable self-regenerative ledge cutting insert of the subject injection is characterized by a planar body member of generally square configuration, having opposed planar surfaces which define a peripheral edge surface. Preferably extending from each peripheral edge surface is an elongated, consumable self-regenerative ledge that is of smaller width than the width of the planar body member. Each ledge is formed unitary with the body member and is of a desired cross-sectional geometry along the full or partial length of the peripheral edge so as to accommodate the radial, axial rake and lead angle required for the milling geometry. The radial rake of the ledge may be positive, neutral or negative by making the ledge diagonal across the peripheral edge of the body. Similarly, the axial rake can be made positive, neutral or negative. The length of the ledge may be 25% to 100% the length of a peripheral cutting edge of the insert and is dependent on the insert locating mechanism of the cutter body module. In operation, one end or edge of the elongated ledge of the new and improved cutting insert contacts the workpiece and, being properly oriented, it is consumed either by wear, chipping off or burning off, and at the same time it does not damage any of the other portions of the milling tool. The consumed edge effectively generates a fresh edge behind it, i.e., along the length of the ledge, thereby providing a new cutting edge whereby the milling process may be continuous until the entire length of the ledge has been consumed. The rate of consumption of the ledge depends on the work material, tool material, the machining conditions such as the speed and feed rates, and the geometry of the ledge.

Further objects and advantages of the subject invention will become apparent from a detailed description of the invention taken in conjunction with the drawings.

DESCRIPTION OF THE DRAWINGS

FIG. 1 is a perspective view of a first embodiment of the new and improved consumable, self-regenerative ledge cutting insert according to the subject invention;

FIG. 2 is a side elevational view of the consumable, self-regenerative ledge cutting insert of FIG. 1;

FIG. 3 is an end elevational view of the cutting insert of FIG. 1;

FIG. 4 is a detailed edge view of a corner of the cutting insert of FIG. 1;

FIG. 8 is a perspective view of a second embodiment of the new and improved cutting insert of the subject invention;

FIG. 9 is a side elevational view of the consumable, self-regenerative ledge cutting insert of FIG. 8;

FIG. 10 is an end elevational view of the cutting insert of FIG. 8;

FIG. 11 is a detailed edge view of a corner of the cutting insert of FIG. 8; and FIG. 12 is a perspective view of the new and improved cutting insert of the subject invention during a milling cutting operation of a workpiece.

DETAILED DESCRIPTION OF PREFERRED EMBODIMENTS

Figure 5:
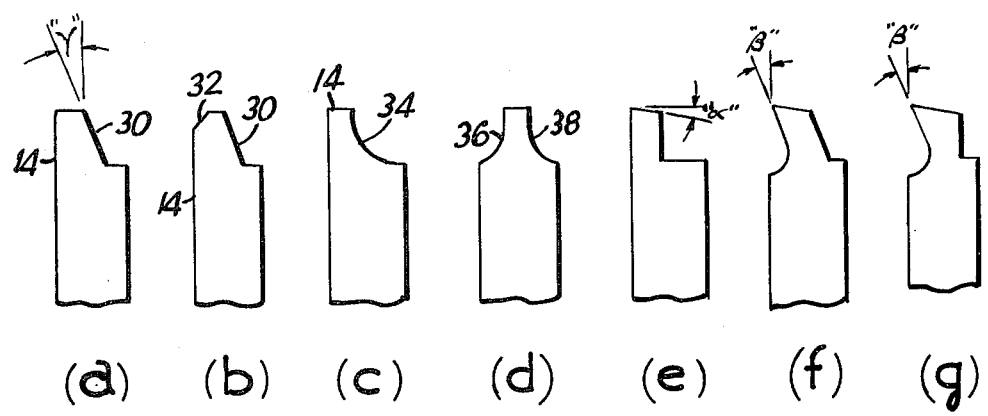
FIGS. 5(a)-(g) are end elevational views of several configurations of ledges of the cutting insert of the subject invention.

Turning to FIGS. 1 through 4, a first embodiment of the new and improved cutting insert of the subject invention is generally designated by the numeral 10, and is of unitary construction including a body member 12 and a consumable self-regenerative ledge 14. The body member 12 is of generally square configuration, however, the cutting insert 10 may be configured such that the body member is of any polygonal shape, including triangular and rectangular. The body member 12 is defined by opposed planar parallel surfaces 16 and 18 which are spaced so as to define the peripheral edge surfaces 20, 22, 24 and 26. The spacing between the planar surfaces 16 and 18 is of a width designated $W_1$.

The consumable, self-regenerative ledge 14 may extend along a portion or whole length of one peripheral surface of the body member or, as shown in the embodiment of FIGS. 1 through 4, about the entire periphery of the body member, with the cross-section of the ledge being generally rectangular, as more particularly illustrated in FIG. 4. The width of the ledge 14 is designated $W_2$ while the depth ledge is designated "D" and corresponds to the maximum depth of cut of the insert 10. The width $W_2$ is less than the width $W_1$ of the body member 12.

In a cutting operation, as more fully described hereinafter, when the cutting insert 10 is mounted in a milling cutter, one end of the elongated ledge 14 is continually consumed, and hence a fresh cutting edge is generated along the entire length of the ledge, such that the cutting process is continuous until the entire length of the ledge 14 is consumed. Thus, the ledge 14 is a consumable self-regenerative ledge, with the rate of consumption of the ledge depending on several parameters, including the work material, the tool material, machining conditions such as speed and feed rate, and the specific geometry or configuration of the ledge 14. The cutting insert 10 of the subject invention may be applied to a face milling application in which case the cutting insert 10 would be utilized in a cutter tool having a dish angle of approximately 1°, or stated differently, wherein the clearance under the insert in the radial direction would be on the order of 0.002 to 0.020 inches for a ½" length of ledge. The depth of the cut in the workpiece would be limited to the dimension "D" for an individual insert as shown in FIG. 4.

Figure 6:
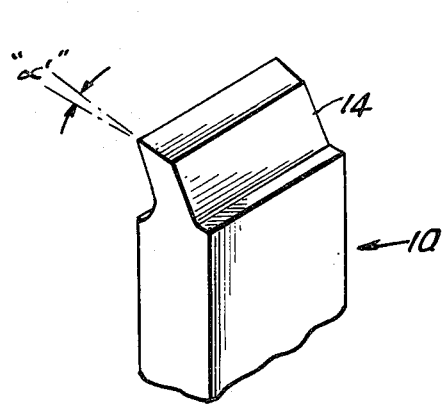
FIGS. 6 and 7 are perspective views of alternate ledge configurations.
Figure 7:
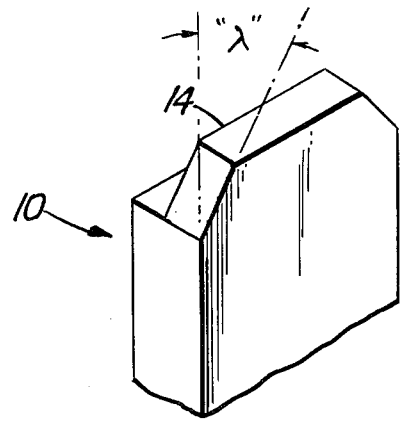

The ledge 14 may have various cross-sectional geometries, as for example, the geometries illustrated in FIGS. 5 through 7. The influence of geometry on tool life is significant, and accordingly, various geometries which may be employed for the ledge 14 of the cutting insert are illustrated in FIGS. 5(a)-(g). The cross-section of the ledge 14 illustrated in FIG. 5(a) is tapered and has a variable thickness with depth, with the angle "γ" of the inclined side surface 30 of the ledge being preferably about 15° to 45°. The ledge configuration illustrated in FIG. 5(b) is generally similar to the ledge configuration illustrated in FIG. 5(a) except that a K-land 32 having an angle of approximately 5° to 45° is employed on the opposite side of inclined surface 30. The embodiment illustrated in FIG. 5(c) utilizes an elliptical arc 34 on one side of the ledge 14, while the embodiment illustrated in FIG. 5(d) uses elliptical, hyperbolic or circular arcs 36 and 38 on both sides of the ledge 14. The ledge configuration of FIG. 5(e) is similar to the ledge configuration illustrated in FIGS. 1 through 4, except that an angular clearance "α" up to 30° may be provided when the cutting insert 10 is utilized for cutting high temperature alloys or materials having high spring back rates. The embodiments of FIGS. 5(f) and 5(g) provide the ledge 14 with a positive rake in the axial direction of the cutter, with the angle "β" preferably being no more than 15° which is particularly suitable for use in machining high temperature alloys.

The specific geometry of the ledge 14 of the cutting insert 10 can be used to vary or select the desired rake angles, both axial or radial, of the desired cutting geometry, which would otherwise require different cutter body designs. The latter requirement may be substantially eliminated by the specific design of the ledge configuration 14 of the cutter insert 10 whereby the cutting insert 10 can be employed with a standard wedge lock assembly in a cutter body design, preferably with the cutter body design having a zero degree lead angle, zero degree radial rake, and a small axial rake, usually on the order of −1° to +5°.

Referring to FIG. 6, the ledge configuration 14 may include a clearance angle "α'" which is especially useful for machining high temperature alloys and other materials having a high spring back rate.

Lead angle is the angle left on the side wall of the workpiece after the milling cutter passes the workpiece. The lead angle "λ" may be on the order of 1°-75°. In the ledge configuration of FIG. 7, the lead angle of the ledge at one or both ends thereof may be ground up to 45°. FIG. 7 also refers to the length of the ledge which can vary along the peripheral edge of insert.

In an alternate embodiment of the subject invention, as illustrated in FIGS. 8 through 11, the orientation of the elongated ledge 14' along each peripheral side 20'-26' of the consumable, self-regenerative ledge cutting insert 10' is employed to accommodate the radial rake of the cutting geometry. More particularly, radial rake can be made positive, neutral or negative by configuring each elongated ledge 14' to extend diagonally across the generally rectangular peripheral surface 20'-26' of the body member 12'. The degree of radial rake can be from −15° to +15°.

Referring to FIG. 12, when the cutting insert 10' is employed for face milling of workpiece 50, the cutting insert 10' should have a dish angle "X" of approximately 1°, with the radial clearance being approximately 0.002 to 0.020 inches for a ½" length of ledge. The depth of cut would be limited to the depth "D'" of the consumable self-regenerative ledge 14'. During the cutting operation, as one end of the elongated consumable self-regenerative ledge 14' contacts the workpiece 50 and is thus consumed, a fresh cutting edge behind it, extending along the entire length of the ledge 14' is developed, whereby the milling process may be maintained, continuous along the entire length of the ledge 14'. Following consumption of the length of the ledge 14', the cutting insert 10' may be indexed so as to enable the next ledge 14' to be employed in the cutting operation.

Accordingly, there is provided a new and improved cutting insert having a ledge portion which defines a cutting edge that, during operation of the cutting insert, is consumed and thus generates a fresh edge behind it along the entire length of the ledge whereby the cutting process may be maintained continuously until the entire length of the ledge is consumed. The consumable self-regenerative ledge cutting insert may have a cross-sectional configuration and may be disposed relative to the main body portion of the cutting insert whereby the rake angles, both axial and radial, as well as the clearance angle desired of the cutting geometry may be realized. The new and improved consumable self-regenerative ledge cutting insert is capable of machining difficult-to-machine materials at greater speeds, usually on the order of 4 to 6 times (600 SFPM) the speed of presently available tools for the same tool life. The new and improved consumable self-regenerative ledge cutting insert thus provides the advantages of higher speed which reduces the force requirements, as well as the horsepower consumption for the same rate of material removal, thus reducing machining time and giving rise to higher production rates. A superior surface finish of the workpiece is also realized. Since the cutting insert geometry is varied to change the milling geometry, the cutting body design is standardized and preferably a cutter body design having zero degree lead angle, zero degree radial rake, and an axial rake on the order of −1° to +5° may be employed. The consumable self-regenerative ledge cutting insert may be secured to the standardized body design utilizing either a built-in pocket type holding mechanism or a cartridge type mechanism.

While the subject invention has been described with reference to several preferred embodiments, it is apparent that various modifications, alterations and changes may be made therein by one skilled in the art without departing from the scope and spirit of the invention as defined by the appended claims.

We claim:

1. A consumable self-regenerative ledge cutting insert comprising:
    a planar body member having opposed, generally parallel surfaces which are spaced to define peripheral edge surfaces, at least one peripheral edge surface including an elongated, projecting ledge having improved cross-sectional configuration extending along the length thereof and formed unitary therewith, said ledge being of smaller width that the width between the spaced surfaces of the body member and defining a cutting edge of the cutting insert whereby during a cutting operation one end of the elongated ledge continually contacts a workpiece and is continuously consumed so as to define a new cutting edge along the length of the ledge, the ledge having angled, tapered or arcuate cross-sectional geometric configuration.

2. A consumable self-regenerative ledge cutting insert as in claim 1 wherein the cross-section of the ledge tapers inwardly from the peripheral surface of the body member to the distal edge of the ledge.

3. A consumable self-regenerative ledge cutting insert as in claim, 1, wherein one elongated side of the ledge is angled relative to the opposite elongated side thereof.

4. A consumable self-regenerative ledge cutting insert as in claim 1, wherein one elongated side of the ledge is arcuate.

5. A consumable self-regenerative ledge cutting insert as in claim 1, wherein the opposed elongated sides of the ledge are arcuate.

6. A consumable self-regenerative ledge cutting insert as in claim 1 wherein the cross-section of the ledge is angled with respect to the plane of the planar body member so as to define an axial rake angle for the insert.

7. A consumable self-regenerative ledge cutting insert as in claim 1 wherein at least one end of said elongated ledge is angled to define a clearance angle for the cutting insert.

8. A consumable self-regenerative ledge cutting insert as in claim 1 wherein the elongated ledge extends diagonally across said peripheral edge surface of the planar body member thereby defining a radial rake angle cutting edge.

9. An indexable consumable self-regenerative ledge cutting insert comprising a planar body member of generally rectangular configuration including opposed, generally parallel surfaces which are spaced to define peripheral edge surfaces, said planar body member formed unitary with elongated projecting ledges respectively extending from each said peripheral edge surface, each elongated projecting ledge extending along at least a portion of the length of the associated peripheral edge surface and being of smaller width than the width of the peripheral edge surface, each said elongated ledge extending diagonally across said respective peripheral edge surface such that each said elongated ledge defines a cutting edge disposed at a radial rake angle whereby during the cutting operation, one end of an elongated ledge continually contacts the workpiece and is continuously consumed in a manner to define a new cutting edge along the length of said ledge until such time as the ledge is consumed, after which the cutting insert may be indexed to the next ledge cutting edge.

10. A consumable self-regenerative ledge cutting insert as in claim 9 wherein the cross-section of each projecting ledge is generally square.

11. A consumable self-regenerative ledge cutting insert as in claim 9 wherein the cross-section of each ledge tapers inwardly from the peripheral surface of the body member to the distal edge of the ledge.

12. A consumable self-regenerative ledge cutting insert as in claim 9, wherein one elongated side of each ledge is angled relative to the opposite elongated side thereof.

13. A consumable self-regenerative ledge cutting insert as in claim 9, wherein one elongated side of each ledge is arcuate.

14. A consumable self-regenerative ledge cutting insert as in claim 9, wherein the opposite elongated sides of each ledge are arcuate.

15. A consumable self-regenerative ledge cutting insert as in claim 9, wherein the cross-section of each ledge is angled with respect to the plane of the planar body member so as to define an axial rake angle for the insert.

16. A consumable self-regenerative ledge cutting insert as in claim 9, wherein at least one end of each said elongated ledge is angled to define a clearance angle for the cutting insert.

* * * * *